(12) United States Patent
Spurlock et al.

(10) Patent No.: US 10,133,642 B2
(45) Date of Patent: Nov. 20, 2018

(54) TECHNIQUES FOR PRESENTING VIEWS OF A BACKUP ENVIRONMENT FOR AN ORGANIZATION ON A SUB-ORGANIZATIONAL BASIS

(71) Applicant: Cobalt Iron, Inc., Lawrence, KS (US)

(72) Inventors: Richard R. Spurlock, Lawrence, KS (US); Robert M. Marett, Lawrence, KS (US); J. Mitchell Haile, Somerville, MA (US)

(73) Assignee: Cobalt Iron, Inc., Lawrence, KS (US)

( * ) Notice: Subject to any disclaimer, the term of this patent is extended or adjusted under 35 U.S.C. 154(b) by 65 days.

(21) Appl. No.: 14/625,556

(22) Filed: Feb. 18, 2015

(65) Prior Publication Data

US 2015/0236916 A1    Aug. 20, 2015

Related U.S. Application Data

(60) Provisional application No. 61/941,029, filed on Feb. 18, 2014.

(51) Int. Cl.

| | |
|---|---|
| *G06F 15/16* | (2006.01) |
| *G06F 11/14* | (2006.01) |
| *H04L 12/24* | (2006.01) |
| *H04L 29/08* | (2006.01) |
| *G06F 11/32* | (2006.01) |
| *G06F 11/34* | (2006.01) |

(52) U.S. Cl.
CPC ...... *G06F 11/1464* (2013.01); *G06F 11/1458* (2013.01); *G06F 11/32* (2013.01); *H04L 41/0856* (2013.01); *H04L 67/1097* (2013.01); *G06F 11/1448* (2013.01); *G06F 11/3409* (2013.01)

(58) Field of Classification Search
CPC .................. G06F 11/1464; H04L 41/0856
USPC ........................................ 709/203
See application file for complete search history.

(56) References Cited

U.S. PATENT DOCUMENTS

| | | | | |
|---|---|---|---|---|
| 7,206,790 | B2 * | 4/2007 | Kodama | G06F 17/30973 |
| 7,546,323 | B1 * | 6/2009 | Timmins | G06F 11/1464 |
| 8,244,678 | B1 | 8/2012 | Hartland et al. | |
| 8,943,441 | B1 * | 1/2015 | Patrick | G06F 3/0484 |
| | | | | 345/440 |
| 2005/0091518 | A1 | 4/2005 | Agarwal et al. | |
| 2005/0149577 | A1 * | 7/2005 | Okada | G06F 11/1458 |
| 2008/0059704 | A1 * | 3/2008 | Kavuri | G06F 3/061 |
| | | | | 711/117 |
| 2008/0145050 | A1 * | 6/2008 | Mayer | H04J 14/0227 |
| | | | | 398/49 |

(Continued)

OTHER PUBLICATIONS

International Search Report and Written Opinion issued in PCT/US2015/016423, dated May 15, 2015 (7 pages).

*Primary Examiner* — Sm A Rahman
(74) *Attorney, Agent, or Firm* — Polsinelli PC

(57) ABSTRACT

Techniques for operating a computing system to facilitate visualization of a backup environment are disclosed. In one particular embodiment, the techniques may be realized as a method of operating a computing system to facilitate visualization of a backup environment. The method may comprise performing a backup service for an organization and rendering a graphical user interface that presents a plurality of views of the backup environment for the organization on a sub-organizational basis.

24 Claims, 9 Drawing Sheets

(56) References Cited

U.S. PATENT DOCUMENTS

| | | | |
|---|---|---|---|
| 2008/0307067 A1* | 12/2008 | Cisler | H04L 63/0272 709/218 |
| 2009/0106155 A1 | 4/2009 | Castellanos et al. | |
| 2010/0332453 A1 | 12/2010 | Prahlad et al. | |
| 2013/0173553 A1* | 7/2013 | Apte | G06F 7/00 707/640 |
| 2014/0180915 A1* | 6/2014 | Montulli | H04L 51/08 705/40 |

* cited by examiner

TECHNIQUES FOR PRESENTING VIEWS OF A BACKUP ENVIRONMENT FOR AN ORGANIZATION ON A SUB-ORGANIZATIONAL BASIS

CROSS-REFERENCE TO RELATED APPLICATIONS

This patent application claims priority to U.S. Provisional Patent Application No. 61/941,029, filed Feb. 18, 2014, which is hereby incorporated by reference herein in its entirety.

FIELD OF THE DISCLOSURE

The present disclosure relates generally to backing up data. and, more particularly, to techniques for presenting views of a backup environment for an organization on a sub-organizational basis.

BACKGROUND OF THE DISCLOSURE

Organizations may have large numbers of business groups, locations, and needs for data backup, archive, and storage related services. Managing these differing needs over a plurality of groups and locations may present planning, communication, and security challenges. Sharing common resources such as storage, network resources, and computational resources across different groups may also present challenges.

In view of the foregoing, it may be understood that there may be significant problems and shortcomings associated with current data backup management technologies for organizations.

SUMMARY OF THE DISCLOSURE

Techniques for operating a computing system to facilitate visualization of a backup environment are disclosed. In one particular embodiment, the techniques may be realized as a method of operating a computing system to facilitate visualization of a backup environment, the method may comprise performing a backup service for an organization, and rendering a graphical user interface that presents a plurality of views of the backup environment for the organization on a sub-organizational basis.

In accordance with other aspects of this particular embodiment, the techniques may include providing a backup policy associated with a first level of the organization.

In accordance with other aspects of this particular embodiment, the backup policy may be inherited at a second level of the organization which may be lower than the first level of the organization.

In accordance with additional aspects of this particular embodiment, one or more portions of the policy may be modifiable by a user associated with the second level of the organization.

In accordance with further aspects of this particular embodiment, the ability to modify the policy by the user associated with the second level of the organization may be based upon at least one of a security setting, a user privilege, and a role.

In accordance with other aspects of this particular embodiment, one or more portions of the policy may not be modifiable by a user associated with the second level of the organization.

In accordance with additional aspects of this particular embodiment, a higher level of the organization may determine which portions of the policy are modifiable by one or more lower levels of the organization based on at least one of: a security setting and a delegation of responsibility setting.

In accordance with further aspects of this particular embodiment, the policy may be associated with at least one of a data type and a backup service.

In accordance with other aspects of this particular embodiment, backup resource utilization may be tracked at a plurality of levels of the organization.

In accordance with additional aspects of this particular embodiment, backup resource utilization tracking may include at least one: storage utilization, network utilization, and computer processor utilization.

In accordance with further aspects of this particular embodiment, the tracking of resource utilization may be used to assign costs for used resources to a level of the organization.

In accordance with other aspects of this particular embodiment, the assignment of costs may include at least one of a markup added to the costs, a margin added to the costs, and a fee added to the costs.

In accordance with additional aspects of this particular embodiment, the assignment of costs may allow a higher level of the organization to share resources among a plurality of lower levels of the organization and to charge additional costs for resource management overhead.

In accordance with further aspects of this particular embodiment, a first level of the organization may be a backup service provider and one or more second levels of the organization may include clients of the backup service provider.

In accordance with other aspects of this particular embodiment, the plurality of views of the backup environment for the organization on a sub-organizational basis may provide at least one of: identification of backup resource utilization for planning purposes, identification of backup resource utilization for security purposes, identification of backup resource utilization for cost attribution, and identification of backup resource errors.

In another particular embodiment, the techniques may be realized as an article of manufacture for operating a computing system to facilitate visualization of a backup environment. The article of manufacture may comprise at least one non-transitory processor readable storage medium, and instructions stored on the at least one non-transitory processor readable storage medium. The instructions may be configured to be readable from the at least one non-transitory processor readable storage medium by at least one computer processor and thereby cause the at least one computer processor to operate so as to perform a backup service for an organization, and render a graphical user interface that presents a plurality of views of the backup environment for the organization on a sub-organizational basis.

In yet another particular embodiment, the techniques may be realized as a system for operating a computing system to facilitate visualization of a backup environment. The system may comprise one or more processors communicatively coupled to a network. The one or more processors may be configured to perform a backup service for an organization, and render a graphical user interface that presents a plurality of views of the backup environment for the organization on a sub-organizational basis.

In accordance with other aspects of this particular embodiment, the processor may be further configured to provide a backup policy associated with a first level of the organization.

In accordance with additional aspects of this particular embodiment, the backup policy may be inherited at a second level of the organization which is lower than the first level of the organization.

In accordance with further aspects of this particular embodiment, the higher level of the organization may determine which portions of the policy are modifiable by one or more lower levels of the organization based on at least one of: a security setting and a delegation of responsibility setting.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

FIG. 5 provides a view of an information entry screen for a user in accordance with an embodiment of the present disclosure.

FIG. 6 provides a view of a new sub-organization in accordance with an embodiment of the present disclosure.

DETAILED DESCRIPTION OF EMBODIMENTS

Figure 1:
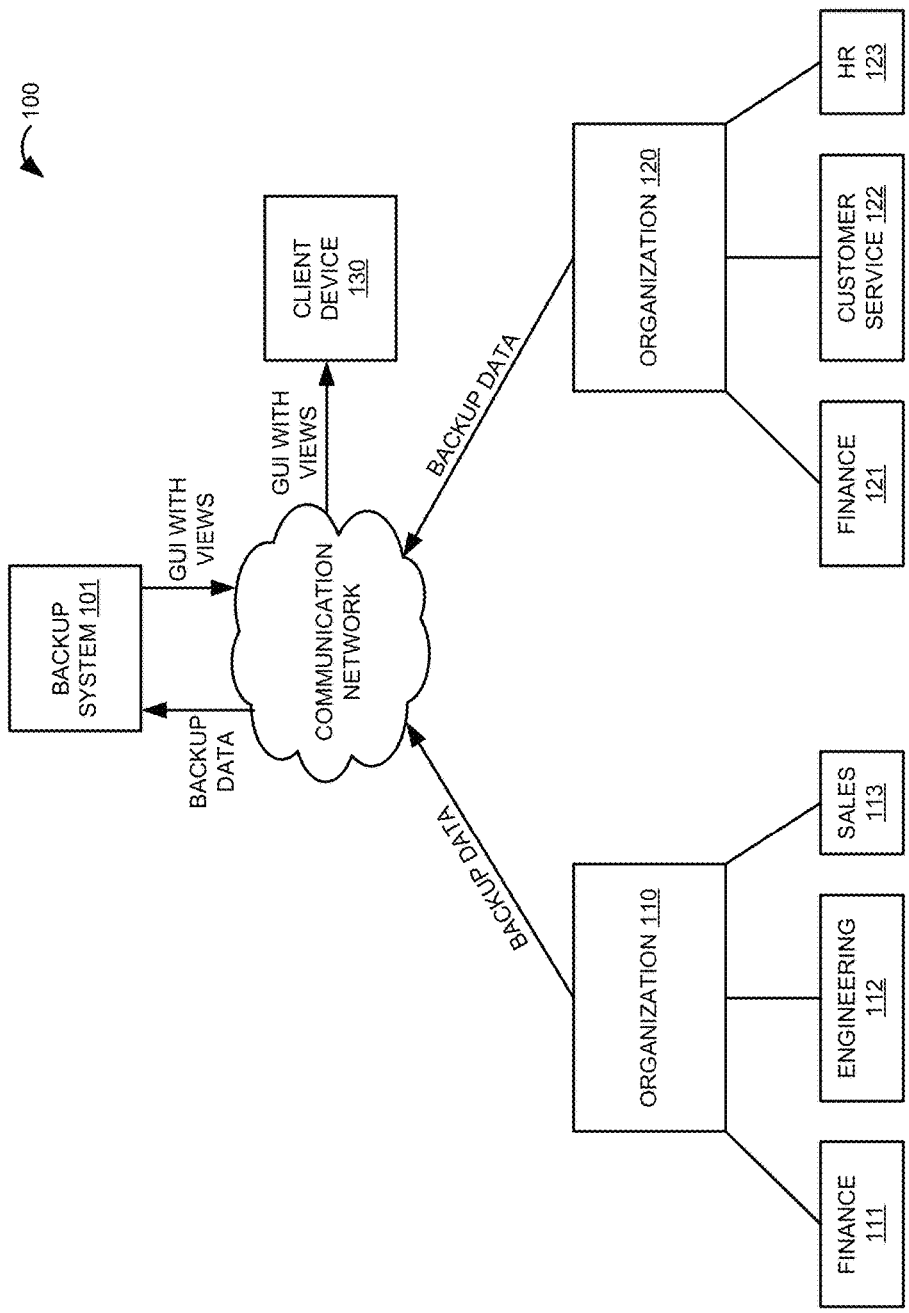
FIG. 1 illustrates an implementation of a backup communication system in accordance with an embodiment of the present disclosure.

Disclosed herein are systems, methods, and software to facilitate visualization of a backup environment. FIG. 1 illustrates an exemplary implementation of a backup communication system 100. Backup communication system 100 includes backup system 101, organization 110, organization 120, and client device 130. Backup system 101 typically includes a storage system for storing backup data, which could include a large storage array of drives, network attached storage (NAS), server racks, and other equipment. Organization 110 includes sub-organizations of finance 111, engineering 112, and sales 113. Organization 120 includes sub-organizations of finance 121, customer service 122, and human resources (HR) 123. Note that in this example, the sub-organizations of organizations 110 and 120 are defined by the various different departments of each organization, but the sub-organizations of organizations 110 and 120 could be defined differently in other examples, such as by different subsidiaries, regional offices, or any other possible way of subdividing an organization. Although depicted as a two level organization, it should be appreciated that an unlimited number of levels may be accommodated (e.g., n-levels). Additionally, organizational structures may also include flat structures and non-hierarchical structures (e.g., peer organizations or groups, matrices, etc.). Additionally, in some embodiments, different types of entities may be represented, either together or in separate displays (e.g., an organization, a group, a person, a country, a region, a division, etc.).

Figure 2:
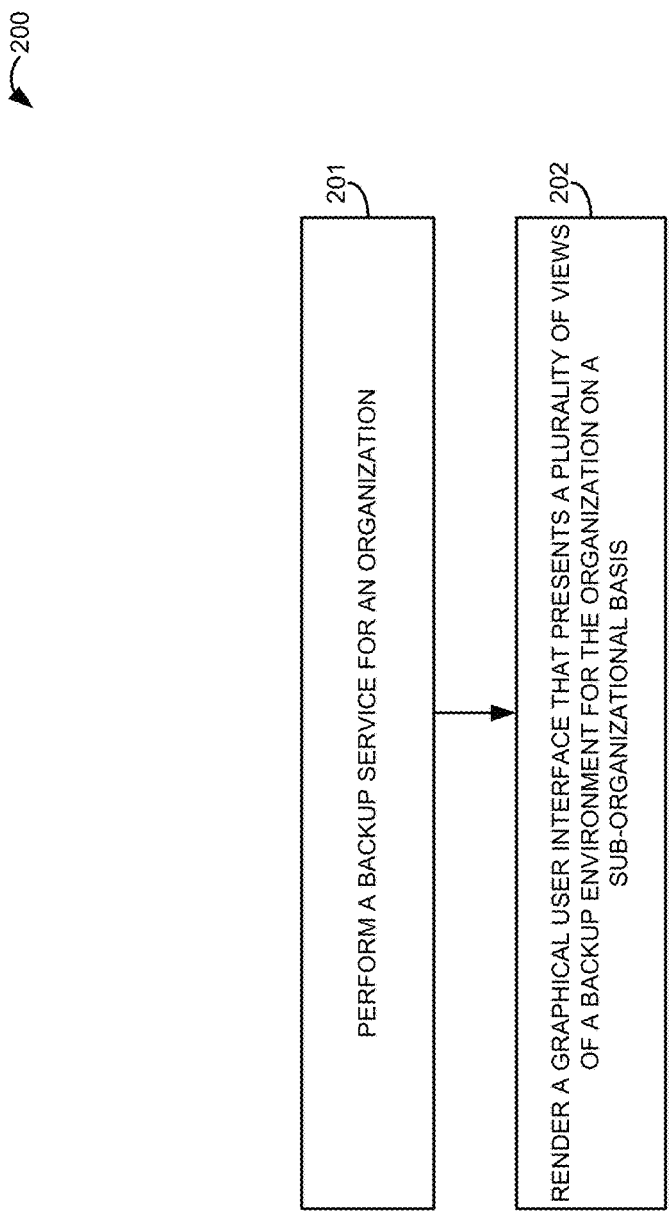
FIG. 2 depicts a visualization process in accordance with an embodiment of the present disclosure.

In operation, and with respect to visualization process 200 of FIG. 2, backup system 101 performs a backup service for organizations 110 and 120 (Step 201). In some examples, to perform the backup service, backup system 101 may deploy a backup client (not shown) to each organization 110 and 120. The backup client could then collect data that the organizations 110 and 120 want to backup and transfer this backup data for delivery to backup system 101 via a communication network. In some implementations, the backup client deployed to an organization 110 could keep track of which sub-organizations 111-113 the backup data is associated with, and tag this data with flags, metadata, or some other indicators to inform backup system 101 of which portions of the backup data are associated with the various sub-organizations 111-113.

Once backup system 101 has received the backup data, backup system 101 renders a graphical user interface (GUI) that presents a plurality of views of a backup environment for the organization on a sub-organizational basis (Step 202). Typically, the GUI is rendered as a webpage for client device 130 to view remotely over a communication network, such as the Internet, but backup system 101 could render the GUI for viewing with other applications, systems, or devices in some examples. The GUI rendered by backup system 101 provides several views of the backup environment of an organization on a sub-organizational basis. For example, a user could utilize client device 130 to access a webpage served by backup system 101 to view a GUI that presents views of the backup environment for organization 110 on a sub-organizational basis for sub-organizations 111-113. Although not shown in FIG. 1, each of the sub-organizations 111-113 of organization 110 could have further sub-organizations, which in turn could have further sub-organizations themselves, and this hierarchical subdividing of the organizations and its sub-organizations could continue according to the organizational structure of the organization 101. The hierarchy of the organization 110 and its various sub-organizations 111-113 could be displayed graphically in the plurality of views of the backup environment for organization 110.

Backup system 101 could also provide detailed information within each of the plurality of views of the backup environment for the organization. For example, the GUI rendered by backup system 101 could allow a user operating client device 130 to view, on a sub-organizational basis, an amount of data backed up, frequency of backups, retention of backed up data, redundancy of the backed up data, the cost of the backup service per sub-organization 111-113, and any other metrics about the backup data on a sub-organizational basis. For example, engineering department 112 could be backing up larger amounts of data on a more frequent time interval than the finance department 111 and sales department 113, resulting in a higher cost for the backup service attributable to the engineering department 112, and this higher cost could be displayed in the view for the engineering department 112 of organization 110. A high-level view of the organization 110 could also display a pie chart or graph that indicates the percentage of utilization of the backup service attributable to each of the sub-organizations 111-113. A user of the backup service associated with organization 110 could also define specific policies on a sub-organizational basis, by type of data, or by any other scheme as desired by the user. For example, the user could set a retention policy for an email data type for seven years, but define a shorter retention policy for data associated with a web server application. In another example, the user could specify a number of redundant copies of data belonging to the engineering department 112, but not require any redundancy for data associated with the sales department 113. Other user preferences for the data backup service may be defined and are within the scope of this disclosure.

Advantageously, backup system 101 provides a plurality of views of a backup environment for an organization 110 on a sub-organizational basis. In this manner, a user of the backup service is presented with these views in a hierarchical fashion using client device 130. One exemplary implementation of a plurality of views of a backup environment for an organization will now be discussed with respect to FIGS. 3, 4, 5, and 6.

Figure 3:
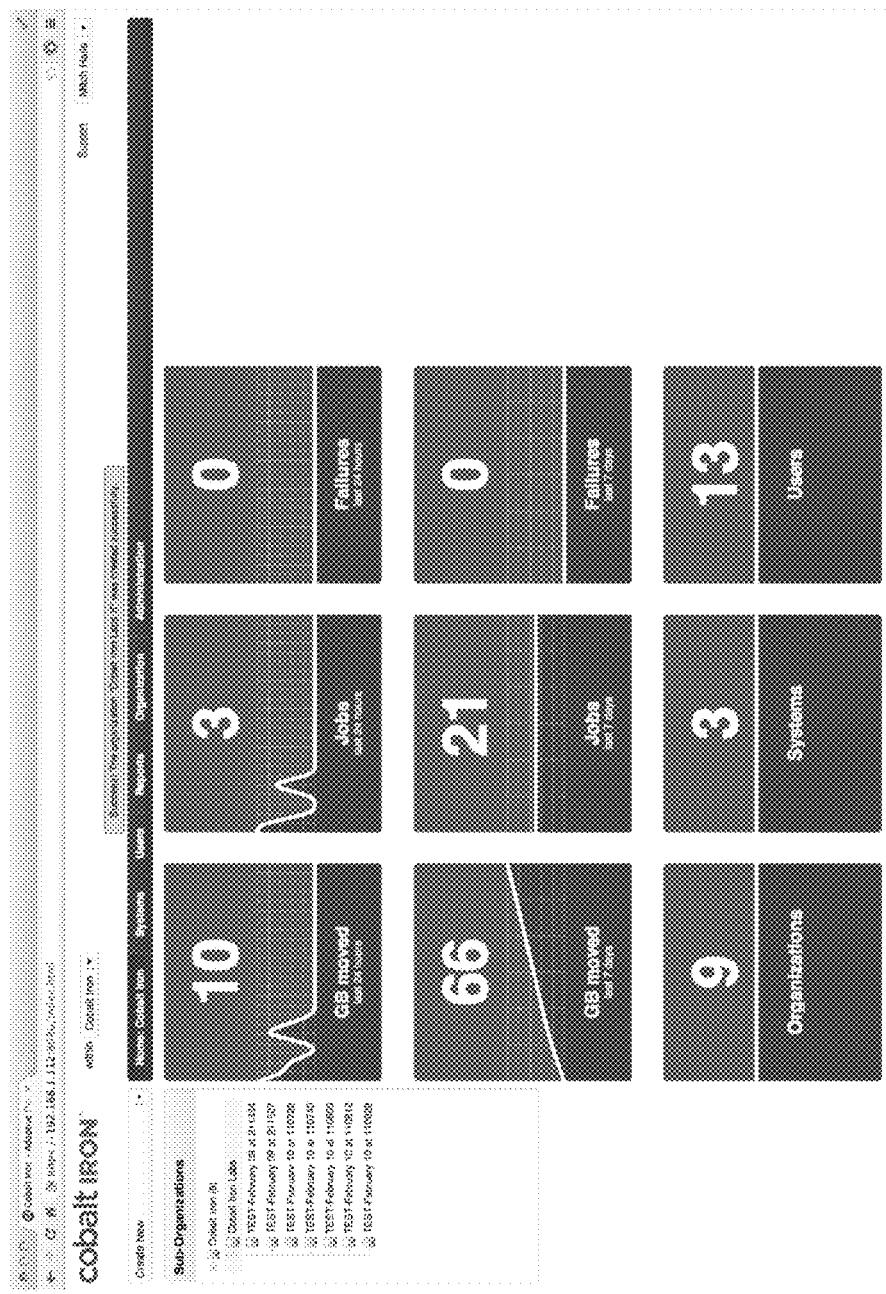
FIG. 3 provides a view of a backup environment for an organization in accordance with an embodiment of the present disclosure.

FIG. 3 provides a view of a backup environment for an organization called Cobalt Iron™. As shown in the menu on the left-hand side of FIG. 3, the organization includes eight sub-organizations, including a sub-organization entitled "Cobalt Iron Labs". This view includes information related to several metrics for the backup service for the organization, including a number of gigabytes of data backed up in the past day and week, the number of backup jobs that ran in the past day and week, and the number of failed jobs in the past day and week. The information displayed also includes the total number of organizations and sub-organizations, the number of systems, and the number of users.

Figure 4:
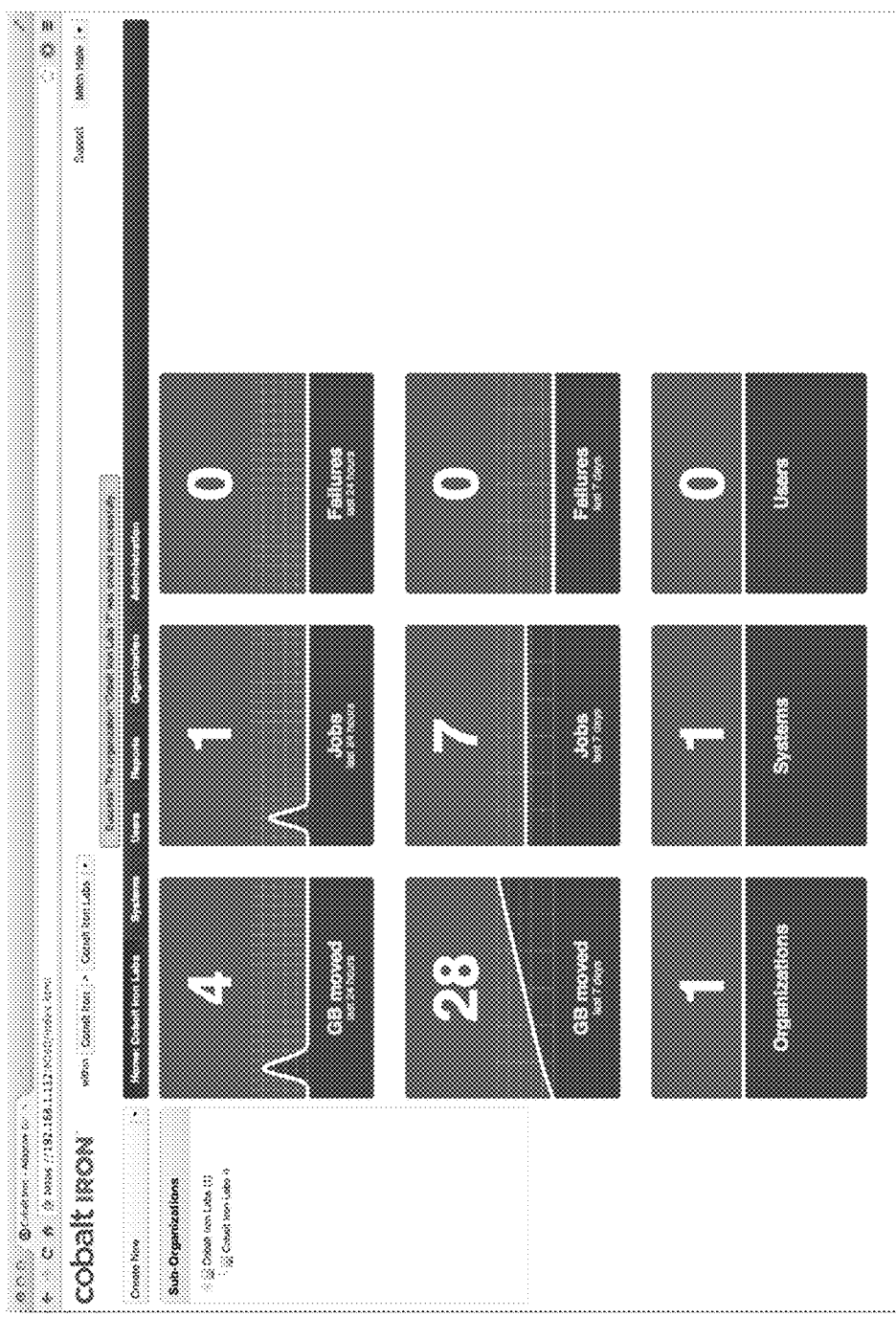
FIG. 4 provides a view of a sub-organization in accordance with an embodiment of the present disclosure.

FIG. 4 provides a view of the "Cobalt Iron Labs" sub-organization. This view includes information related to several metrics for the backup service for the sub-organization of "Cobalt Iron Labs", including a number of gigabytes of data backed up, the number of backup jobs that ran, and the number of failures on a daily and weekly basis. The information displayed also includes the total number of organizations associated with the sub-organization "Cobalt Iron Labs", along with the number of systems and users.

Figure 5:
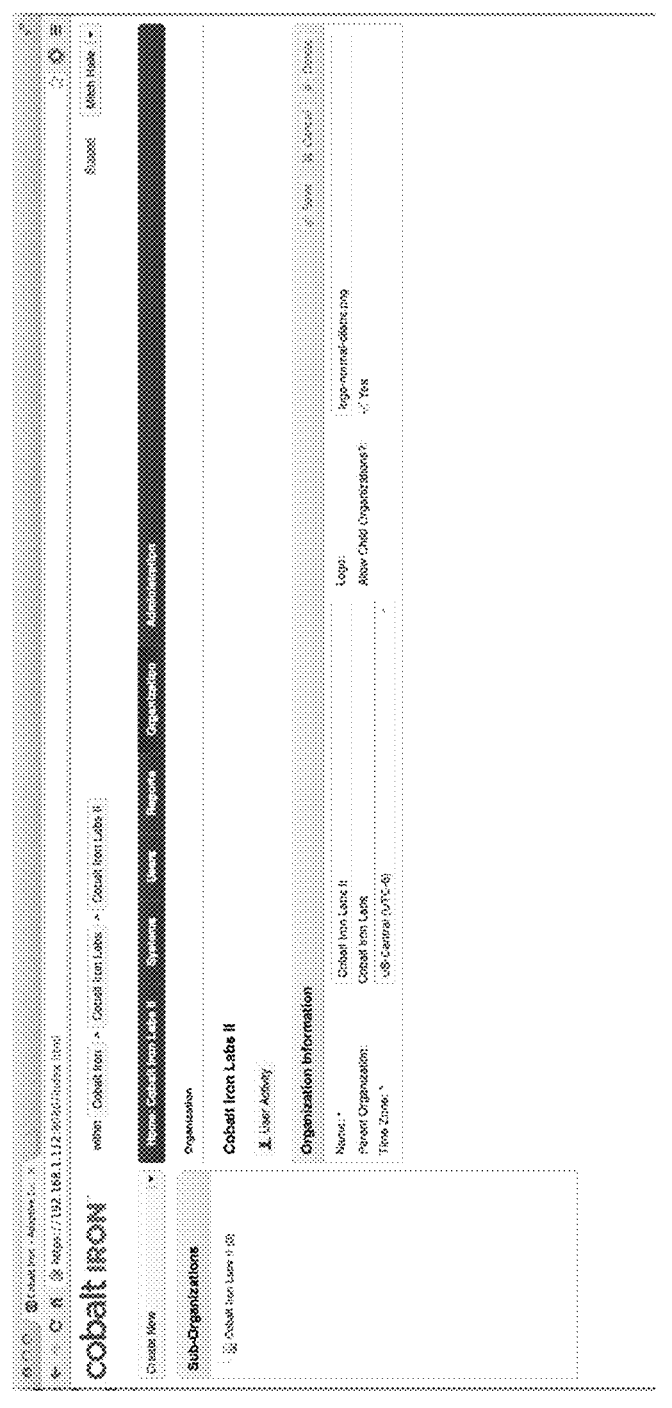

FIG. 5 provides a view of an information entry screen for the user to create a new sub-organization and define its properties. In this example, the user is creating a new "Cobalt Iron Labs II" sub-organization under the organization "Cobalt Iron Labs". The information entry screen provides a form for the user to enter the name of the sub-organization, provide an image for a logo of the sub-organization, and select the time zone. The user is also presented with the parent organization of the new sub-organization, which is shown as "Cobalt Iron Labs" in this example, and the option to allow or disallow the creation of further sub-organizations under the newly created organization.

Figure 6:
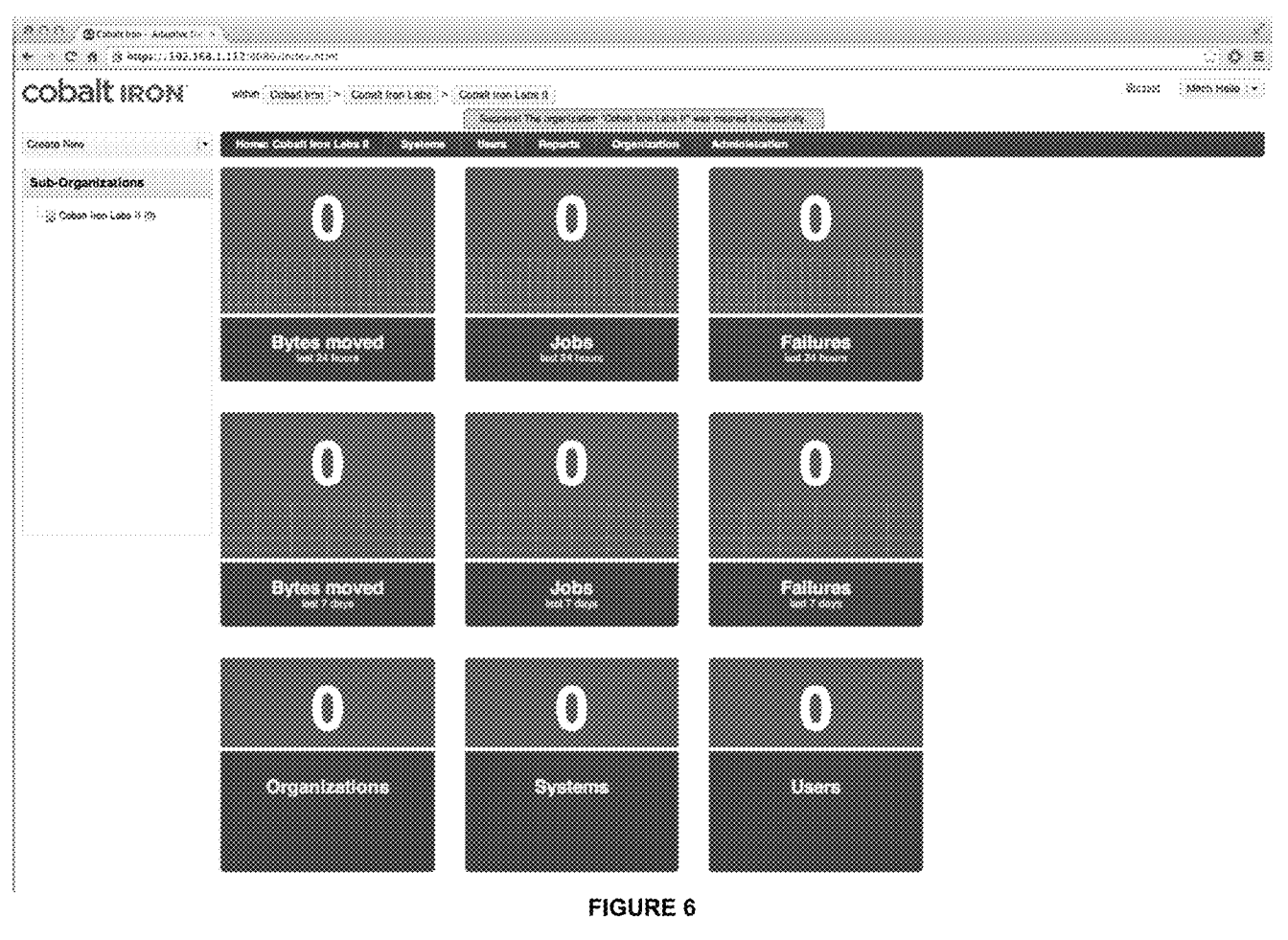

FIG. 6 provides a view of the new "Cobalt Iron Labs II" sub-organization. As shown by the hierarchy along the top of FIG. 5, "Cobalt Iron Labs II" is a sub-organization of "Cobalt Iron Labs", which is itself a sub-origination of the Cobalt Iron™ organization. Since the "Cobalt Iron Labs II" sub-organization was recently created, there are no metrics to display in this view, since the backup service has not yet run for this sub-organization. Notably, the user can quickly and easily select between the different views shown in FIGS. 3, 4, and 6 by using the navigational buttons at the top of the views.

Figure 7:
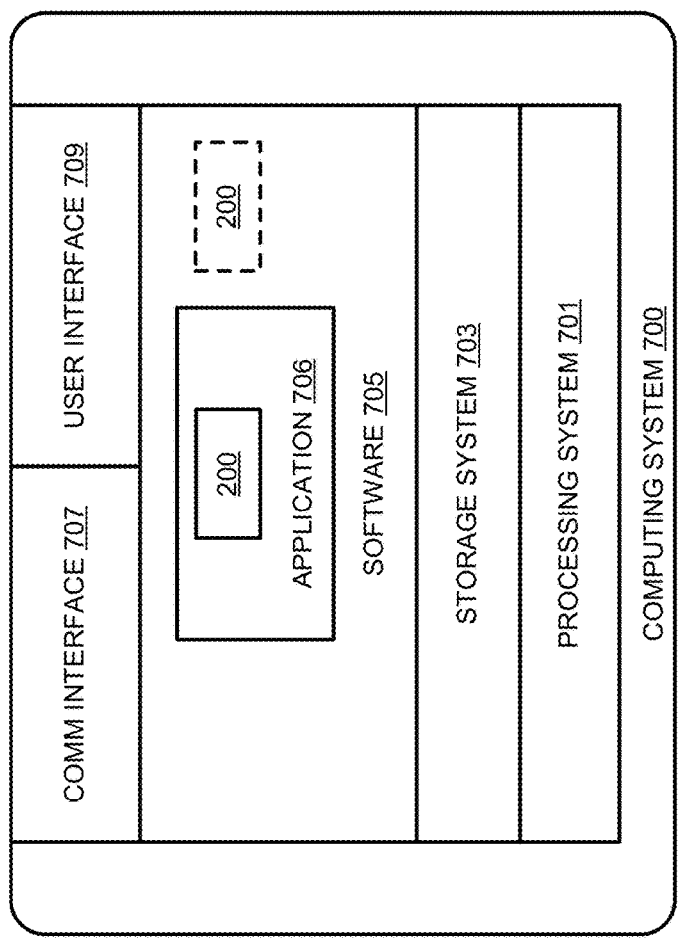
FIG. 7 is a block diagram that illustrates a computing system in accordance with an embodiment of the present disclosure.

FIG. 7 is a block diagram that illustrates computing system 700 in an exemplary implementation. Computing system 700 provides an example of backup system 101, although system 101 could use alternative configurations. Computing system 700 includes processing system 701, storage system 703, software 705, communication interface 707, and user interface 709. Software 705 includes application 706 which itself includes visualization process 200. Visualization process 700 may optionally be implemented separately from application 706.

Computing system 700 may be representative of any computing apparatus, system, or systems on which application 706 and visualization process 200 or variations thereof may be suitably implemented. Examples of computing system 700 include mobile computing devices, such as cell phones, tablet computers, laptop computers, notebook computers, and gaming devices, as well as any other type of mobile computing devices and any combination or variation thereof. Note that the features and functionality of computing system 700 may apply as well to desktop computers, server computers, and virtual machines, as well as any other type of computing system, variation, or combination thereof.

As mentioned above, computing system 700 includes processing system 701, storage system 703, software 705, communication interface 707, and user interface 709. Processing system 701 is operatively coupled with storage system 703, communication interface 707, and user interface 709. Processing system 701 loads and executes software 705 from storage system 703. When executed by computing system 700 in general, and processing system 701 in particular, software 705 directs computing system 700 to operate as described herein for visualization process 200 or variations thereof. Computing system 700 may optionally include additional devices, features, or functionality not discussed herein for purposes of brevity.

Referring still to FIG. 7, processing system 701 may comprise a microprocessor and other circuitry that retrieves and executes software 705 from storage system 703. Processing system 701 may be implemented within a single processing device but may also be distributed across multiple processing devices or sub-systems that cooperate in executing program instructions. Examples of processing system 701 include general purpose central processing units, application specific processors, and logic devices, as well as any other type of processing device, combinations, or variations thereof.

Storage system 703 may comprise any computer-readable media or storage media readable by processing system 701 and capable of storing software 705. Storage system 703 may include volatile and nonvolatile, removable and non-removable media implemented in any method or technology for storage of information, such as computer readable instructions, data structures, program modules, or other data.

Storage system 703 may be implemented as a single storage device but may also be implemented across multiple storage devices or sub-systems co-located or distributed relative to each other. Storage system 703 may comprise additional elements, such as a controller, capable of communicating with processing system 701. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 709, processing system 701 loads and executes portions of software 705, such as visualization process 200, to render a graphical user interface that presents a plurality of views of a backup environment for an organization on a sub-organizational basis. Software 705 may be implemented in program instructions and among other functions may, when executed by computing system 700 in general or processing system 701 in particular, direct computing system 700 or processing system 701 to perform a backup service for an organization and render a graphical user interface that presents a plurality of views of the backup environment for the organization on a sub-organizational basis. Software 705 may include additional processes, programs, or components, such as operating system software or other application software. Examples of operating systems include Windows®, iOS®, and Android®, as well as any other suitable operating system. Software 705 may also comprise firmware or some other form of machine-readable processing instructions executable by processing system 701. In general, software 705 may, when loaded into processing system 701 and executed, transform computing system 700 overall from a general-purpose computing system into a special-purpose computing system customized to facilitate application licensing as described herein for each implementation.

Communication interface 707 may include communication connections and devices that allow for communication between computing system 700 and other computing systems (not shown) or services, over a communication network or collection of networks. Examples of connections and devices that together allow for inter-system communication may include network interface cards, antennas, power amplifiers, radio frequency (RF) circuitry, transceivers, and other communication circuitry. The aforementioned network, connections, and devices are well known and need not be discussed at length here.

User interface 709 may include a voice input device, a touch input device for receiving a gesture from a user, a motion input device for detecting non-touch gestures and other motions by a user, and other comparable input devices and associated processing elements capable of receiving user input from a user. Output devices such as a display system, speakers, haptic devices, and other types of output devices may also be included in user interface 709. The aforementioned user input devices are well known in the art and need not be discussed at length here. User interface 709 may also include associated user interface software executable by processing system 701 in support of the various user input and output devices discussed above. Separately or in conjunction with each other and other hardware and software elements, the user interface software and devices may provide a graphical user interface, a natural user interface, or any other kind of user interface. User interface 709 may be omitted in some examples.

Figure 8:
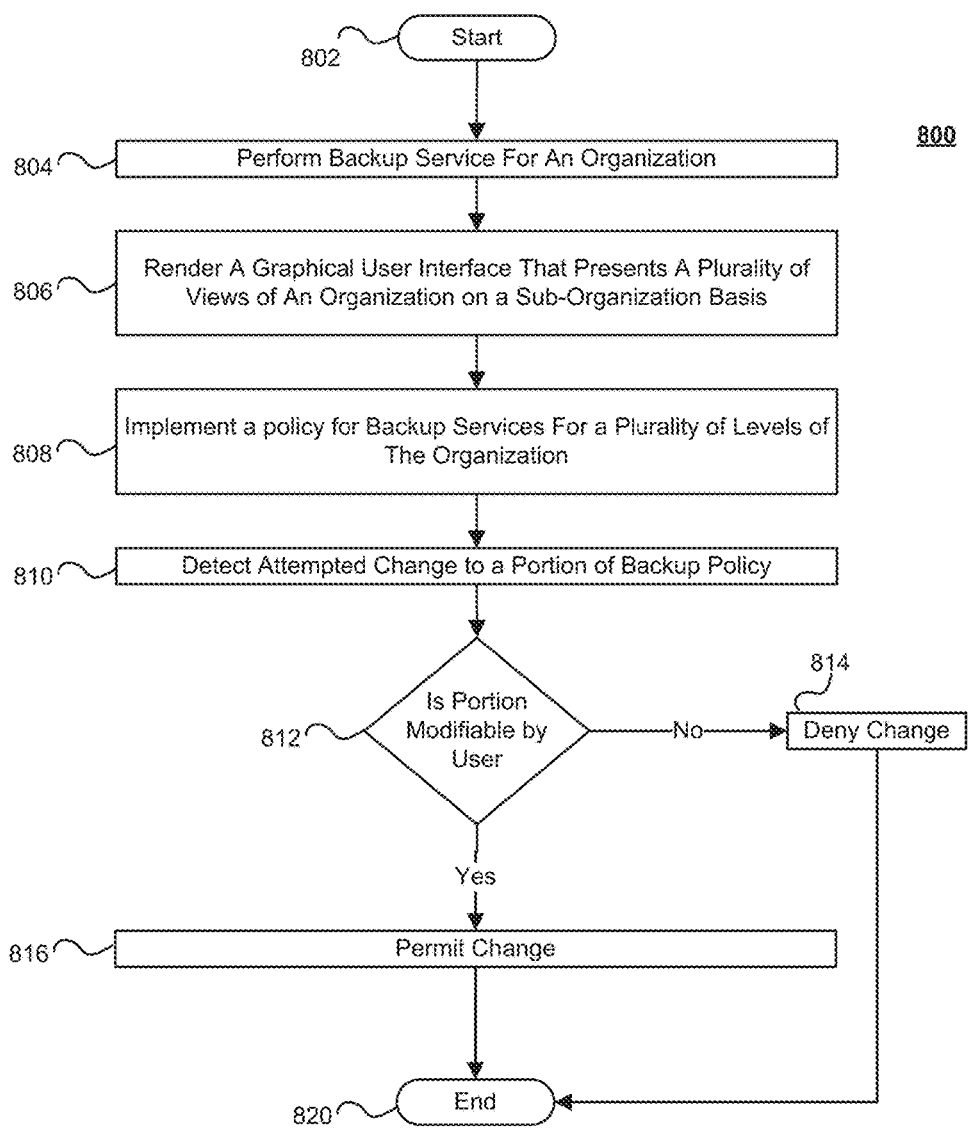
FIG. 8 depicts a flowchart of a process for implementing a backup policy in accordance with an embodiment of the present disclosure.

FIG. 8 depicts a flowchart of a process 800 for implementing a backup policy in accordance with an embodiment of the present disclosure. At block 802, the process 800 may begin. At block 804, a backup service may be performed for an organization. For example, in some embodiments, backup system 101 of FIG. 1 may perform a backup service for organizations 110 and 120. In some examples, to perform the backup service, backup system 101 may deploy a backup client to each organization 110 and 120. The backup client could then collect data that the organizations 110 and 120 want to backup and transfer this backup data for delivery to backup system 101 via a communication network. In some implementations, the backup client deployed to an organization 110 could keep track of which sub-organizations 111-113 the backup data is associated with, and tag this data with flags, metadata, or some other indicators to inform backup system 101 of which portions of the backup data are associated with the various sub-organizations 111-113.

At block 806, once backup system 101 has received the backup data, backup system 101 renders a graphical user interface (GUI) that presents a plurality of views of a backup environment for the organization on a sub-organizational basis. Typically, the GUI is rendered as a webpage for client device 130 to view remotely over a communication network, such as the Internet, but backup system 101 could render the GUI for viewing with other applications, systems, or devices in some examples.

At block 808, a policy may be implemented for backup services for a plurality of levels of an organization. For example, a backup policy may be implemented by a user of a GUI using a template, fillable fields, drop-down boxes, radio buttons, and/or other user interface data entry controls. A backup policy may be implemented at any level of an organization and may be associated with an organization level, a group, a role, and/or a set of privileges. A backup policy may enforce compliance with one or more backup goals (e.g., minimum retention periods for data, backup frequency, encryption, compression, portions of data included in a backup or archive, portions of data excluded from a backup or archive, etc.). A backup policy may also assist in managing backup resources (e.g., storage space available, network bandwidth used, permissible backup or archive times, computational resources used, etc.).

In some embodiments, a backup policy may facilitate delegation and/or enforce security. For example, a higher level of an organization may implement a policy and lower levels of the organization may inherit the policy. Portions of the policy may be modifiable by one or more authorized users at a lower level of the organization. One or more portions of the policy may not be modifiable by one or more authorized users at a lower level of the organization. Thus, a higher level may control security and/or delegation by limiting what portions of a policy lower levels of an organization or sub-organizations can modify. Policies may be associated with only a portion of backup data in some embodiments (e.g., backups of email, or HR data, etc.).

At block 810, an attempted change to a backup policy may be detected.

At block 812, it may be determined whether the user has permission to modify the portion for which the current modifications are attempted. Permissions may depend on privileges or roles associated with a user, group, sub-organization, and/or organization level. An ability to modify a portion of a backup policy may depend on a type of policy (e.g., associated with backup, associated with archive, associated with restoration, etc.), a type of modification (e.g., addition of resources, removal of resources, changing a scope of a backup action to include or exclude data, etc.), a type of data associated with a backup (e.g., email, database, etc.), the entity associated with the data (e.g., the user, group, organization level associated with the data), and other factors. If the user is not allowed to make the modification to the policy, the method may deny the change at block 814 and then end at block 820. If the user is authorized to make the change, the method may continue at block 816. At block 816, the change may be made and the method may end at block 820.

Figure 9:
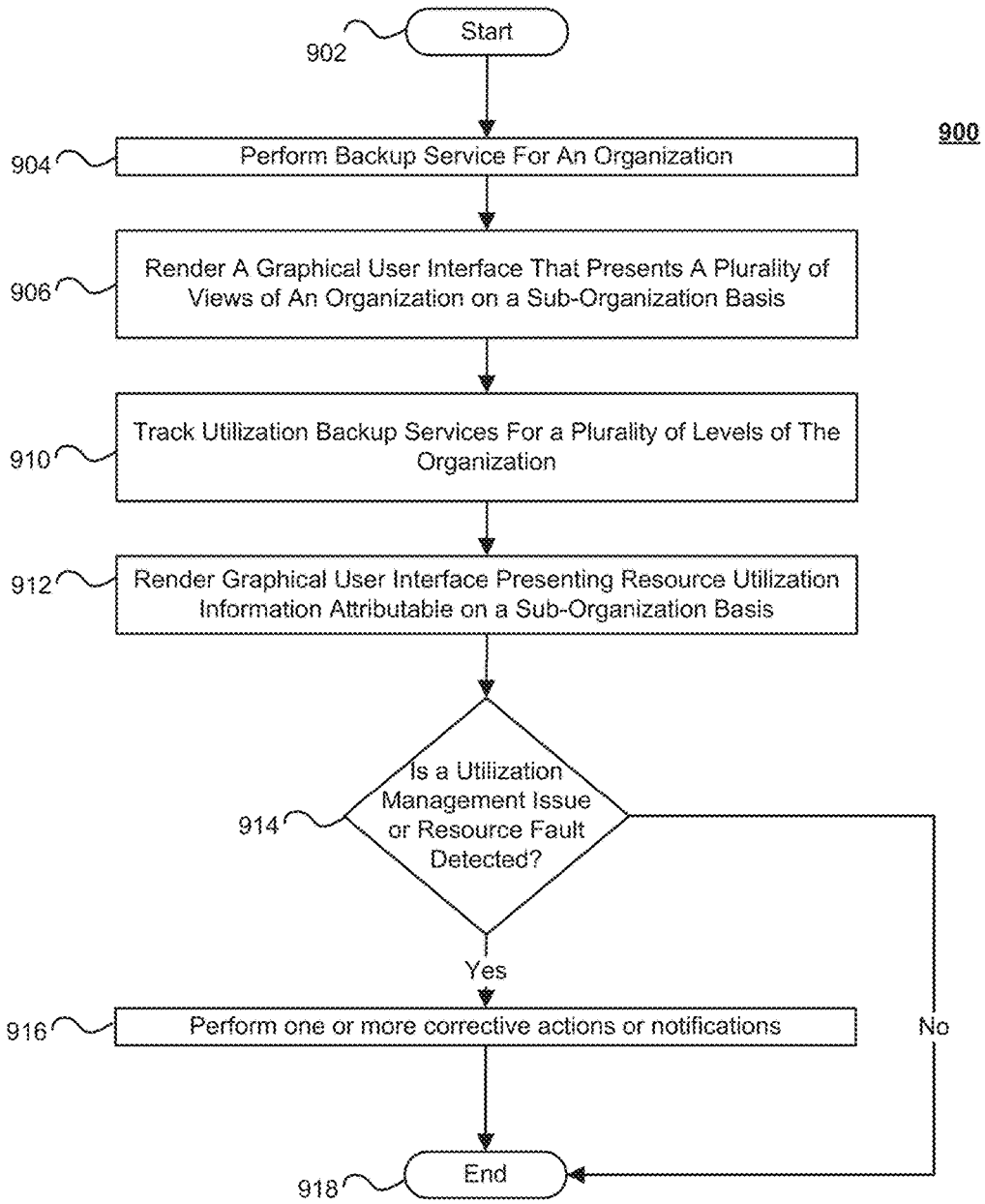
FIG. 9 depicts a flowchart of a process for backup resource utilization tracking in accordance with an embodiment of the present disclosure.

FIG. 9 depicts a flowchart of a process 900 for backup resource utilization tracking in accordance with an embodiment of the present disclosure. The process 900 may start at block 902.

At block 904, a backup service may be performed for an organization. For example, in some embodiments, backup system 101 of FIG. 1 may perform a backup service for organizations 110 and 120. In some examples, to perform the backup service, backup system 101 may deploy a backup client to each organization 110 and 120. The backup client could then collect data that the organizations 110 and 120 want to backup and transfer this backup data for delivery to backup system 101 via a communication network. In some implementations, the backup client deployed to an organization 110 could keep track of which sub-organizations 111-113 the backup data is associated with, and tag this data with flags, metadata, or some other indicators to inform backup system 101 of which portions of the backup data are associated with the various sub-organizations 111-113.

At block 906, once backup system 101 has received the backup data, backup system 101 renders a graphical user interface (GUI) that presents a plurality of views of a backup environment for the organization on a sub-organizational basis. Typically, the GUI is rendered as a webpage for client device 130 to view remotely over a communication network, such as the Internet, but backup system 101 could render the GUI for viewing with other applications, systems, or devices in some examples.

At block 910, utilization of backup services may be tracked for a plurality of levels of an organization. For example, utilization of storage, computational resources, and/or network resources may be tracked. Tracking may be performed at an organizational level, a sub-organizational level, a department level, a group level, and/or a user level. Tracking may be performed by city, state, region, country, or other geographical area. At block 912, a graphical user interface may be rendered which may display graphs, charts, reports, or other data presentations depicting utilization of resources. The graphical user interface may group utilization by a plurality of ways including by organizational level, geographical level, utilization type, etc.

At block 914, it may be determined whether a utilization management issue has been detected or a fault has been detected. A utilization management issue may occur, for example, when a backup job is approaching a threshold level of one or more resources (e.g., storage, network bandwidth, computational resources, etc.) A fault may occur when one or more errors is detected (e.g., a backup process halted or erred, storage is insufficient, a backup server crashed, a network error occurred, etc.). If a utilization management issue or a fault has been detected, the method may continue at block 916. If a utilization management issue or a fault has not been detected, the method may end at block 918.

At block 916, one or more corrective actions may be taken. Corrective actions may include notifying an administrator, allocating one or more additional resources, retrying a job or process, etc.

The functional block diagrams, operational sequences, and flow diagrams provided in the figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

The invention claimed is:

1. A method of operating a computing system to facilitate visualization of a backup environment, the method comprising:

performing a backup service for an organization, wherein backup data of the organization is tagged with metadata indicating that the backup data is associated with different levels of a plurality of levels within the organization;

rendering a graphical user interface that presents a plurality of views of the backup environment for the organization, wherein the plurality of views displays backup resource utilization at each level of the plurality of levels, the backup resource utilization is tracked at a plurality of levels of the organization and the backup resource utilization is used to assign costs for used resources to a level of the organization allowing a higher level of the organization to share resources among a plurality of lower levels of the organization and to charge additional costs for resource management overhead;

receiving input from a user directing the computing system to create a new sub-organization at one of the plurality of levels within the organization; and collecting backup data for the newly created sub-organization at a subsequent performance of the backup service.

2. The method of claim 1, further comprising:

providing a backup policy associated with a first level of the organization.

3. The method of claim 2, wherein the backup policy is inherited at a second level of the organization which is lower than the first level of the organization.

4. The method of claim 3, wherein one or more portions of the backup policy are modifiable by a user associated with the second level of the organization.

5. The method of claim 4, wherein the ability to modify the backup policy by the user associated with the second level of the organization is based upon at least one of a security setting, a user privilege, and a role.

6. The method of claim 3, wherein one or more portions of the backup policy are not modifiable by a user associated with the second level of the organization.

7. The method of claim 3, wherein the higher level of the organization determines which portions of the backup policy are modifiable by one or more lower levels of the organization based on at least one of: a security setting and a delegation of responsibility setting.

8. The method of claim 2, wherein the backup policy is associated with at least one of a data type and a backup service.

9. The method of claim 1, wherein backup resource utilization tracking includes at least one: storage utilization, network utilization, and computer processor utilization.

10. The method of claim 1, wherein the assignment of costs includes at least one of a markup added to the costs, a margin added to the costs, and a fee added to the costs.

11. The method of claim 1, wherein a first level of the organization is a backup service provider and one or more second levels of the organization include clients of the backup service provider.

12. The method of claim 1, wherein the plurality of views of the backup environment for the organization on a sub-organizational basis provides at least one of: identification of backup resource utilization for planning purposes, identification of backup resource utilization for security purposes, identification of backup resource utilization for cost attribution, and identification of backup resource errors.

13. The method of claim 1, wherein at least one of the plurality of levels within the organization subdivide the organization according to at least one of subsidiaries, departments, locations, regions, offices, groups, persons, and divisions.

14. The method of claim 1, further comprising:
providing a backup policy for the organization;
detecting an attempt from a user to change a portion of the backup policy, wherein the user is associated with a level of the plurality of levels within the organization;
determining whether the user has permission to modify the backup policy based on the level of the organization that the user is associated with;
if the user has permission, implementing the attempted change to the backup policy; and
if the user does not have permission, denying the attempted change.

15. The method of claim 1, wherein rendering the graphical user interface comprises:
before tracking utilization of backup services for the plurality of levels within the organization, rendering a first graphical user interface that presents a plurality of views of the organization; and
after tracking utilization of backup services for the plurality of levels within the organization, rendering a second graphical user interface that displays backup resource utilization at each level of the plurality of levels.

16. The method of claim 1, wherein the backup service is selected from one or more backup services made available to the user based upon at least one of a data type, a backup policy, resource consumption by the user, backup resource utilization, a security setting, a user privilege, and a role.

17. An article of manufacture for operating a computing system to facilitate visualization of a backup environment, the article of manufacture comprising: at least one non-transitory processor readable storage medium; and
instructions stored on the at least one non-transitory processor readable storage medium;
wherein the instructions are configured to be readable from the at least one non-transitory processor readable storage medium by at least one computer processor and thereby cause the at least one computer processor to operate to:
perform a backup service for an organization, wherein backup data of the organization is tagged with metadata indicating that the backup data is associated with different levels of a plurality of levels within the organization;
render a graphical user interface that presents a plurality of views of the backup environment for the organization, wherein the plurality of views displays backup resource utilization at each level of the plurality of levels, the backup resource utilization is tracked at a plurality of levels of the organization and the backup resource utilization is used to assign costs for used resources to a level of the organization allowing a higher level of the organization to share resources among a plurality of lower levels of the organization and to charge additional costs for resource management overhead;
receive input from a user directing the at least one computer processor to create a new sub-organization at one of the plurality of levels within the organization; and
collect backup data for the newly created sub-organization at a subsequent performance of the backup service.

18. The article of manufacture of claim 17, wherein the backup service is selected from one or more backup services made available to the user based upon at least one of a data type, a backup policy, resource consumption by the user, backup resource utilization, a security setting, a user privilege, and a role.

19. A system for operating a computing system to facilitate visualization of a backup environment comprising:
one or more processors communicatively coupled to a network, wherein the one or more processors are configured to:
perform a backup service for an organization, wherein backup data of the organization is tagged with metadata indicating that the backup data is associated with different levels of a plurality of levels within the organization;
render a graphical user interface that presents a plurality of views of the backup environment for the organization, wherein the plurality of views displays backup resource utilization at each level of the plurality of levels, the backup resource utilization is tracked at a plurality of levels of the organization and the backup resource utilization is used to assign costs for used resources to a level of the organization allowing a higher level of the organization to share resources among a plurality of lower levels of the organization and to charge additional costs for resource management overhead;

receive input from a user directing the one or more processors to create a new sub-organization at one of the plurality of levels within the organization; and collect backup data for the newly created sub-organization at a subsequent performance of the backup service.

20. The system of claim 19, wherein the one or more processors are further configured to: provide a backup policy associated with a first level of the organization.

21. The system of claim 20, wherein the backup policy is inherited at a second level of the organization which is lower than the first level of the organization.

22. The system of claim 20, wherein the higher level of the organization determines which portions of the backup policy are modifiable by one or more lower levels of the organization based on at least one of: a security setting and a delegation of responsibility setting.

23. The system of claim 19, wherein at least one of the plurality of levels within the organization subdivide the organization according to at least one of subsidiaries, departments, locations, regions, offices, groups, persons, and divisions.

24. The system of claim 19, wherein the backup service is selected from one or more backup services made available to the user based upon at least one of a data type, a backup policy, resource consumption by the user, backup resource utilization, a security setting, a user privilege, and a role.

* * * * *